United States Patent [19]
Lee, II et al.

[11] Patent Number: 4,753,727
[45] Date of Patent: Jun. 28, 1988

[54] SELF-RETAINING SMOOTH BORE INSERT AND METHOD OF INSTALLING SAME

[75] Inventors: Leighton Lee, II, Guilford; Robert J. Kolp, Ivoryton, both of Conn.

[73] Assignee: The Lee Company, Westbrook, Conn.

[21] Appl. No.: 846,961

[22] Filed: Apr. 1, 1986

[51] Int. Cl.⁴ ............................................. B01D 35/00
[52] U.S. Cl. .................................... 710/232; 210/541; 210/542; 248/94
[58] Field of Search ............... 210/232, 234, 249, 251, 210/352, 350, 351, 541, 542; 248/94; 267/60, 134, 135

[56] References Cited

U.S. PATENT DOCUMENTS

| | | | |
|---|---|---|---|
| 2,385,357 | 9/1945 | Haas | 10/1 |
| 2,390,524 | 12/1945 | Eckener | 10/1 |
| 2,969,588 | 1/1961 | Stephens | 29/240 |
| 3,019,517 | 2/1962 | Lovecky | 29/203 |
| 3,175,342 | 3/1965 | Balogh | 210/352 |
| 3,178,810 | 4/1965 | Simmonds | 29/456 |
| 3,407,936 | 10/1968 | Balogh | 210/352 |
| 3,985,259 | 10/1976 | Zell et al. | 220/86 |
| 4,077,101 | 3/1978 | Wallace | 29/240.5 |

Primary Examiner—Frank Sever
Attorney, Agent, or Firm—Chilton, Alix & Van Kirk

[57] ABSTRACT

Three embodiments of a self-retaining fluid system component insert for a smooth bore of predetermined diameter. The insert comprises a helical coil spring with one end thereof connected to the component and having, in its relaxed state an outer diameter slightly greater than the bore diameter to frictionally lock the insert within the bore. The insert has a threaded connector for receiving an elongated tool for mounting the insert by rotating the insert in one angular direction thereof for contracting the coil by its frictional engagement with the smooth wall of the bore.

11 Claims, 5 Drawing Sheets

SELF-RETAINING SMOOTH BORE INSERT AND METHOD OF INSTALLING SAME

SUMMARY OF THE INVENTION

The present invention relates generally to bore inserts and more particularly to a new and improved self-retaining, smooth bore insert and its method of installation.

A principal object of the present invention is to provide a new and improved device and method of installation for securely mounting a miniature fluid system component such as a filter, stop or pressure monitor within a drilled or reamed smooth bore.

Another object of the present invention is to provide a new and improved self-retaining smooth bore insert suitable for zero defect applications such as aerospace applications in which the insert is mounted within a smooth, small diameter bore.

A further object of the present invention is to provide a new and improved self-retaining smooth bore insert for precisely locating one or more miniature fluid system components within a smooth, small diameter bore.

A still further object of the present invention is to provide a self-retaining smooth bore insert which will be self-retaining against a substantial force of up to 5000 g's or more.

Other objects will be in part obvious and in part pointed out more in detail hereinafter.

A better understanding of the invention will be obtained from the following detailed description and the accompanying drawings of illustrative applications of the invention.

DESCRIPTION OF THE PREFERRED EMBODIMENTS

Figure 1:
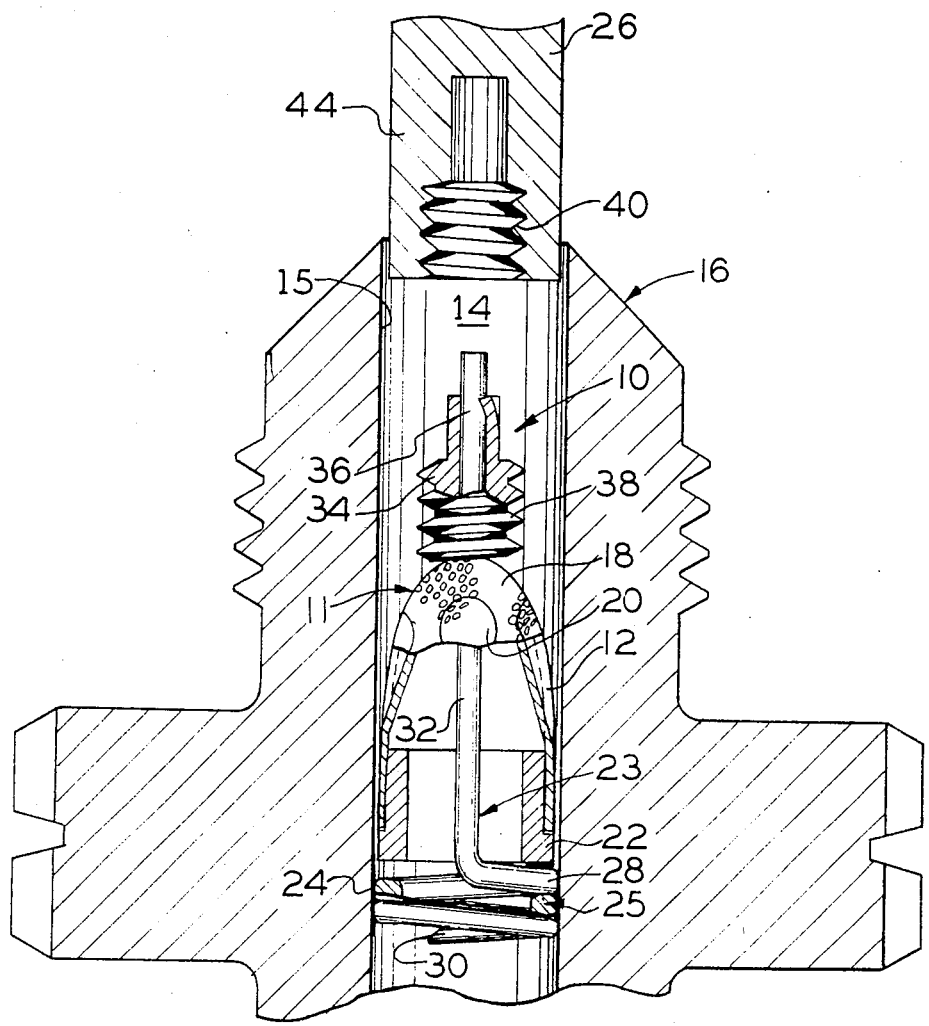
FIG. 1 is an axial section view, partly broken away and partly in section, of a bore insert installation and insert mounting tool illustrating a first preferred embodiment of the present invention.

Although specific forms of the present invention have been selected for illustration in the drawings and the following description is drawn in specific terms to specifically describe the illustrated forms of the invention, the description is not intended to limit the scope of the invention which is defined in the appended claims.

Referring to the drawings and referring particularly to FIG. 1, a self-retaining, smooth bore insert 10 incorporating a first preferred embodiment of the present invention is shown employed for mounting a liquid filter 11 within a bore 14 of a conventional hydraulic fitting 16. The bore 14 is either drilled or reamed to provide a smooth wall 15 and has for example a diameter of 0.187 inches. The filter 11 is designed for filtering liquid flowing in either axial direction and comprises a stainless steel filter screen 12 designed for removing contaminate particles. The filter screen 12 has a suitable pattern of small circular holes and is formed from a small circular disk into a generally elongated cup shape with an outer rounded end 18 and a convoluted perimeter with four equangularly spaced convolutions 20. The filter screen 12 has a cylindrical end secured onto a slightly reduced section of a screen mounting collar 22. The filter 11, composed of the screen 12 and mounting collar 22, has a diameter approximately equal to but slightly less than the diameter of the bore 14.

A wire element 23 of the insert 10 is formed to provide a helical coil spring 25 having a left-hand helix. The coil 25 preferably has a minimum of two turns between its ends 28, 30. In a relaxed state, the helical coil 25 has an outer diameter about 5% greater than the diameter of the smooth bore 14, for example an outer diameter of 0.195 inches when used with a bore diameter of 0.187 inches. The coil 25 is coaxial with the filter element 11 and its inner end 28 is spot welded to the collar 22. The wire element 23 has a long coaxial drive stem 32 which extends through a hole in the rounded end 18 of the filter screen 12. The wire element 23 is formed from round wire stock and after the coil 25 is formed, the outer surface of the coil 25 is suitably machined, for example ground, to provide a cylindrical (i.e. flat) exterior face 24 on the coil and thus on each turn of the coil 25. That coil configuration increases the engagement surface with the wall 15 and increases the inside diameter of the coil for any given wire stock size to reduce the flow restriction caused by the coil 25. Also, the coil spring resilience is thereby increased in relationship to the strength of the wire stem 32 to permit using a larger diameter stock for the stem 32 for transmitting torque to the coil 25 as hereinafter described.

A coaxial threaded male connector 34 is crimped onto the end 36 of the drive stem 32. The threaded male connector 34 has a right-hand thread for receiving a mating threaded female connector 40 of a tool 26 to fasten the tool coaxially to the drive stem 32. The tool can thereby be quickly and easily fastened to and unfastened from the insert 10. The threaded coupling between the tool 26 and insert 10 enables the insert 10 to be installed and removed as hereinafter described without inadvertently dropping that miniature part.

Figure 2:
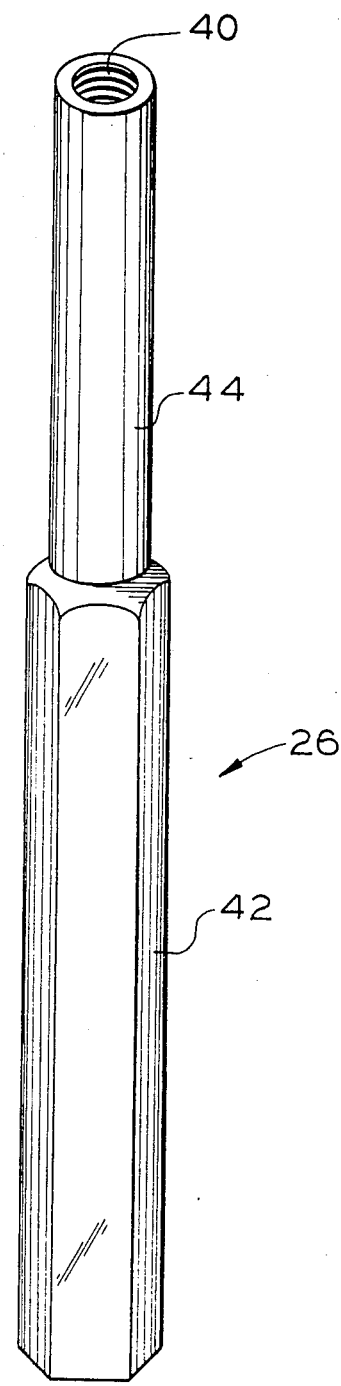
FIG. 2 is an isometric view of the insert mounting tool.

Referring to FIG. 2, the straight elongated tool 26 has a hexagonal handle portion 42 to facilitate gripping the tool and an elongated cylindrical shank 44 dimensioned for insertion within the bore 14 to position the insert 10 at any desired location.

For installing and removing the insert 10, the tool 26 is first fastened to the insert by screwing the tool 26 clockwise onto the threaded male connector 34. For installing the insert 10, the leading end of the coil spring 25 is placed in engagement with the end of the bore 14. The tool is then rotated clockwise while lightly pressing the insert 10 into the bore with the tool 26. The engagement of the leading end of the coil 25 with the bore 14 contemporaneous with the application of clockwise torque causes the spring 24 to contract sufficiently for the insert 10 to slide relatively freely into the bore 14. Clockwise torque is continually applied to the coil 25 as the insert is displaced within the bore 14. After the insert 10 is properly located within the bore, the tool 26 is unscrewed from the male connector 34 by rotating the tool counterclockwise. The counterclockwise tool rotation will not rotate the insert 10 because the coil 25 will thereby be expanded slightly by the frictional resistance of the wall 15 to firmly lock the insert 10 in place.

In the described embodiment, rotation of the tool 26 with approximately five inch-ounces of clockwise torque while applying approximately four ounces of axial force will be sufficient to install the insert 10 as described. When the insert 10 is locked in place, approximately eight pounds of axial force (or up to fifty G's or more depending on the weight of the insert 10) is required to axially displace the miniature component within the bore 14.

Figure 3:
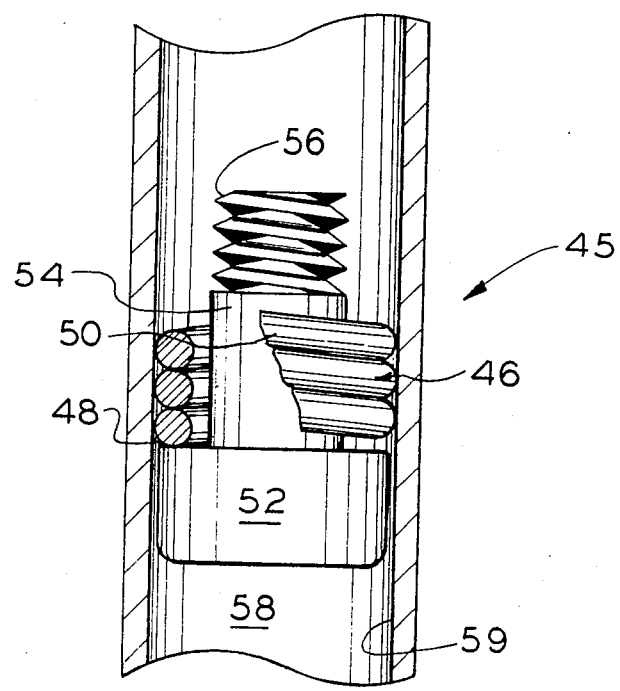
FIG. 3 is an axial section view, partly broken away and partly in section, of a bore insert installation illustrating a second preferred embodiment of the present invention.

Referring to FIG. 3, in a second preferred embodiment 45 of the present invention, the retention coil 46 is mounted on the trailing end of the fluid system component 52 rather than at the leading end as in the embodiment of FIG. 1. The coil 46 has a left-hand helix of round wire with a minimum of two turns between its leading end 48 and its free trailing end 50 (which is broken away). The outer diameter of the coil 46 in its relaxed state and the diameter of the bore 58 are for example the same as in the embodiment of FIG. 1. The bore 58 of the disclosed conduit has a smooth wall 58 in a conventional manner. The leading end 48 of the coil 46 is spot welded to the component 52 so that the coil 46 and component 52 are coaxial. The component 52 may be any functional in-line fluid system component such as a pressure monitor, locating stop, etc. and has a diameter approximately equal to but slightly less than the diameter of the bore 58. An elongated coaxial shank 54 of the component 52 extends through the coil 46 and is formed to provide a threaded male connector 56 at its outer end. The male connector 56 has a left-hand thread for transmitting counterclockwise torque to the coil 46 and thereby radially contract the coil spring 46 as in the embodiment of FIG. 1. A rotary tool (not shown) like the tool 26 but having a mating, threaded female connector is utilized for installing and removing the insert 46 by rotating the insert 45 counterclockwise.

When installing or removing the insert 45, the tool is first screwed onto the male connector 56 and the insert 45 is then rotated counterclockwise with the tool. As described with reference to FIG. 1, the counterclockwise torque will radially contract the coil 46 sufficiently to permit inserting the insert 45 into or withdrawing it from the bore 58.

Figure 4:
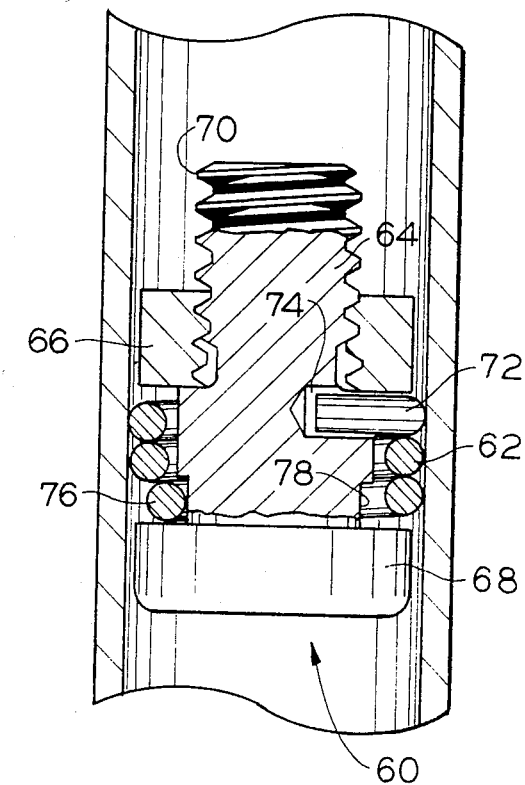
FIG. 4 is an axial section view, partly broken away and partly in section, of a bore insert installation illustrating a third preferred embodiment of the present invention.

Referring to FIG. 4, a third preferred embodiment 60 of a self-retaining smooth bore insert of the present invention is shown having a coil spring 62, a fluid system component 68 with an elongated coaxial stem 64 with a threaded male connector 70 and a mating threaded female collar or nut 66. In this embodiment, the connector 70 has a right-hand thread and the coil spring 62 has a left-hand helix.

Figure 5:
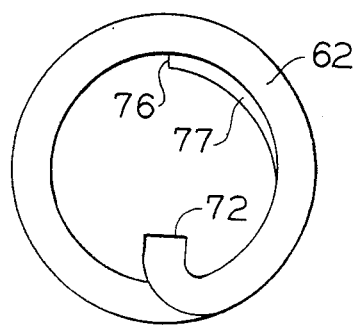
FIGS. 5 and 6 are enlarged end and side views of a helical coil spring of the bore insert shown in FIG. 4.
Figure 6:
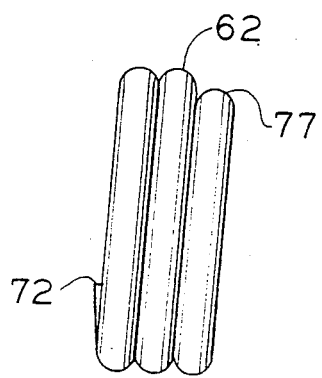

The connector stem 64 has an enlarged, cylindrical section within the coil spring 62. An inwardly extending end tang 72 at the trailing end of the coil spring 62 is received within a radial bore or pocket 74 in the stem 64. The nut or collar 66 is screwed onto the male connector 70 to retain the coil spring 62 between the collar 66 and the component 68 and thereby also retain the end tang 72 within the radial bore 74. The free leading end 76 of the coil spring 62 engages the trailing end face of the component 68. Referring to FIGS. 4-6, the leading end section 77 of the coil spring 62 extends inwardly slightly into an undercut 78 in the connector stem 64. The leading end section 77 has a helix radius which decreases toward the end 76 to facilitate insertion of the coil within the bore without scratching the bore wall. The trailing end 72 of the coil spring 62 is keyed to the stem 64 to provide limited freedom of movement of the spring 62 relative to the stem 64. Such ensures that the coil properly engages the wall of the bore and permits using a greater manufacturing tolerance for achieving an acceptable insert system and accommodates relative expansion and contraction due to thermal variations.

The internal diameter of the bore and the outer diameters of the component 68 and coil the spring 62 in its relaxed state are for example the same as in the embodiments of FIGS. 1 and 2. The bore insert 60 is mounted within the bore by application of clockwise torque in a manner similar to the embodiment of FIG. 1. The torque applied to the connector 64 is transmitted to the spring 62 via the end tang 72. The frictional resistance of the wall of the bore causes the coil 62 to contract slightly to permit the coil to be readily inserted into and removed from the bore. The radial bore 74 and end tang 72 can be provided at the leading end of the coil spring in which case a coil with a righthand helix is employed.

In the design of the bore insert 60, the cost of assembly is reduced by the use of the tang 72 to key the coil spring 62 to the stem 64. Also, the decreasing helix radius of the leading end 77 of the coil eliminates machining operations such as chamfering and deburring which might be required with a cylindrical coil spring.

It can be seen from the exemplary embodiments disclosed that the threaded connector of the insert can be attached to either the leading or trailing end of the coil spring and the coil spring can be mounted on either the leading or trailing side of the fluid system component. Also, the threaded connector can have either a left-hand or right-hand drive thread and the coil spring can have either a left-hand or right-hand helix. What is required is that the coil spring helix and connector thread be matched so that the insert mounting tool is screwed onto the connector in the same angular direction as the coil spring is rotated with the tool to contract the coil spring.

As can be seen, a new and improved mounting device and method are provided for securely mounting an in-line fluid system component or other in-line element within a smooth bore. The method of installation provides for securely and safely mounting an insert in a manner suitable for zero defect hydraulic control applications such as aerospace applications where small bore fluid components are frequently required. The invention is particularly suited for mounting miniature components in small diameter smooth bore applications.

As will be apparent to persons skilled in the art, various modifications and adaptations of the structure above described will become readily apparent without departure from the spirit and scope of the invention, the scope of which is defined in the appended claims.

We claim:

1. A miniature, self-retaining, fluid system component insert adapted to be installed in a smooth bore of predetermined diameter, comprising a fluid system component having a diameter less than said predetermined diameter, and means for retaining said component in the smooth bore sufficient to provide self-retaining against a force having a magnitude which is at least equal to the weight of the insert, including a helical coil spring having no less than two turns and one end thereof connected to the component, the coil spring having a relaxed state with an outer diameter greater than said predetermined diameter to provide frictional resistance between the coil spring and the bore to frictionally lock the insert within the bore, both ends of the coil spring being relatively rottably to contract the coil spring slightly by slight rotation of a first end thereof in one angular direction relative to the ther end thereof as a result of said frictional resistance etween the coil spring and the smooth bore, and means for rotating the insert in said one angular direction comprising a threaded insert connector generally coaxial with the coil spring and connected to said first end of the coil spring, the threaded insert connector adapted to be coupled to a tool with a mating threaded female connector by rotation of the tool in said one angular direction and for installing the insert by rotation of the coil spring with the tool in said one angular direction.

2. A miniature self-retaining insert according to claim 1 wherein said first end of the coil spring is the leading end of the coil spring and wherein the trailing end of the coil spring is free.

3. A miniature self-retaining insert according to claim 1 wherein said first end of the coil spring is the trailing end of the coil spring and wherein the leading end of the coil spring is free.

4. A miniature self-retaining insert according to claim 1 wherein the coil spring is mounted between the insert connector and component.

5. A miniature self-retaining insert according to claim 4 wherein said insert connector is connected to said first end of the coil spring by an end tang extension at said first end of the coil spring and a pocket receiving the end tang.

6. A miniature self-retaining insert according to claim 4 further comprising a collar mounted on the male connector and axially retaining the coil spring.

7. A miniature self-retaining insert according to claim 1 wherein a leading end section of the coil spring has a helix with a decreasing radius toward the leading end.

8. A miniature self-retaining insert according to claim 1 wherein the coil spring is provided by a wire element having an axially extending stem connected to said first end of the coil spring and wherein the insert connector is mounted on the stem.

9. A miniature self-retaining insert according to claim 8 wherein the coil spring has a machined cylindrical surface and wherein the axially extending stem is generally round.

10. A miniature self-retaining insert according to claim 1 wherein the fluid system component is a filter screen.

11. An insert for mounting a miniaturized fluid system component within a smooth bore of predetermined diameter comprising a fluid system component and means for retaining said component in said bore sufficient to provide self-retaining against a force having a magnitude which is at least equal to the weight of the insert, including a helical coil spring having a plurality of turns and a relaxed state with an outer diameter slightly greater than said predetermined diameter to provide frictional resistance between the coil spring and the bore to frictionally lock the insert within the bore, the ends of the coil spring being relatively rotatable to contract the coil spring slightly by rotation of a first end thereof in one angular direction relative to the other end thereof as a result of said frictional resistance between the coil spring and the bore, and means for rotating the coil spring in said one angular direction comprising a connector generally coaxial with the coil spring and connected to said first end thereof and adapted to be coupled to a tool by rotation of the tool in said one angular direction and for installing the insert by rotation of said coil spring with the tool in said one angular direction.

* * * * *

UNITED STATES PATENT AND TRADEMARK OFFICE
CERTIFICATE OF CORRECTION

PATENT NO. : 4,753,727

DATED : June 28, 1988

INVENTOR(S) : Leighton Lee II and Robert J. Kolp

It is certified that error appears in the above-identified patent and that said Letters Patent is hereby corrected as shown below:

Claim 1, line 15, substitute -- rotatable -- for "rottably".

Claim 1, line 17, substitute -- other -- for "ther".

Claim 1, line 18, substitute -- between -- for "etween".

Signed and Sealed this

Third Day of January, 1989

Attest:

DONALD J. QUIGG

Attesting Officer

Commissioner of Patents and Trademarks